(12) United States Patent
   Cigarini

(10) Patent No.: US 12,690,516 B2
(45) Date of Patent: Jul. 28, 2026

(54) HEAD FOR BRUSH CUTTERS

(71) Applicant: TECOMEC S.R.L., Reggio Emilia (IT)

(72) Inventor: Enrico Cigarini, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 118 days.

(21) Appl. No.: 18/768,270

(22) Filed: Jul. 10, 2024

(65) Prior Publication Data

US 2025/0048959 A1     Feb. 13, 2025

(30) Foreign Application Priority Data

Aug. 7, 2023     (IT) ........................ 102023000016854

(51) Int. Cl.
   A01D 34/416         (2006.01)

(52) U.S. Cl.
   CPC ..... A01D 34/4166 (2013.01); A01D 34/4163 (2013.01)

(58) Field of Classification Search
   CPC ........................ A01D 34/4166; A01D 34/4163
   See application file for complete search history.

(56) References Cited

U.S. PATENT DOCUMENTS

| | | | |
|---|---|---|---|
| 7,797,839 | B2 | 9/2010 | Proulx |
| 8,025,249 | B2 * | 9/2011 | Alliss ................. A01D 34/4165 |
| | | | 30/276 |
| 11,582,905 | B2 * | 2/2023 | Alliss ................. A01D 34/4166 |
| 11,903,339 | B1 * | 2/2024 | Laydera-Collins .......................... |
| | | | A01D 34/4163 |

| | | | |
|---|---|---|---|
| 2008/0053052 | A1 | 3/2008 | Cigarini |
| 2011/0239468 | A1 * | 10/2011 | Conlon .............. A01D 34/4163 |
| | | | 30/276 |
| 2013/0133208 | A1 * | 5/2013 | Skinner .............. A01D 34/4166 |
| | | | 29/446 |
| 2016/0128276 | A1 | 5/2016 | Arnetoli |
| 2017/0183194 | A9 * | 6/2017 | Alliss ..................... B65H 54/30 |
| 2017/0208739 | A1 * | 7/2017 | Arnetoli ............ A01D 34/4166 |
| 2017/0347523 | A1 * | 12/2017 | Alliss ................. A01D 34/4166 |

(Continued)

FOREIGN PATENT DOCUMENTS

| | | |
|---|---|---|
| EP | 1894459 | 5/2012 |
| WO | 2023084405 | 5/2023 |

OTHER PUBLICATIONS

Italian Search Report, issued in IT 202300016854, on Jan. 25, 2024, 7 pages.

*Primary Examiner* — Omar Flores Sanchez
(74) *Attorney, Agent, or Firm* — Chrisman Gallo Tochtrop LLC

(57)             ABSTRACT

Head for a brush cutter including a cutting wire and rotate axially around an axis of an outer casing having a first and second through eyelet, a spool with an annular housing and a first and second opening of a channel inside the spool. The spool is configured to decouple rotationally from the outer casing, permitting partial unwinding of the wire. The head provides for reloading the wire, wherein the wire is insertable inside the head from the outside by means of the first and second eyelets, when the first and second eyelets face respectively the first and second openings. The head includes a reloading device coupled with the spool and configured to rotate the spool relatively to the outer casing around the axis to wind the wire on the spool. The head further includes an interface device to show an indicator identifying a relative angular position of the spool.

15 Claims, 6 Drawing Sheets

(56) References Cited

U.S. PATENT DOCUMENTS

2018/0132417 A1    5/2018  Aliss
2021/0185909 A1*   6/2021  Hoche ................. A01D 34/416
2022/0377974 A1*  12/2022  Hoffman ............... A01D 34/90

* cited by examiner

HEAD FOR BRUSH CUTTERS

The present invention relates to a rotating brush cutter head.

It is commonly known that brush cutters are garden tools used for cutting excess vegetation. Brush cutters essentially comprise a motor, a transmission system and a rotating cutting head placed on the end portion of a rod which can be maneuvered by an operator.

The rotating head preferably comprises a cylindrical geometry from which two end portions of a wire made of plastic, nylon or other similar materials protrude.

The motor supplies a driving torque to a drive shaft, which in turn transmits the rotation to the head. The rotary movement of the head rotates a first end portion and a second end portion of the wire emerging from the head at high speed, used for cutting vegetation.

In some embodiments known in the prior art, such heads have the wire arranged inside the head around a spool. Once the wire is used up, a section of wire can be released automatically, the section released from the spool having a sufficient length to be used in the vegetation cutting operation. When the wire on the spool runs out or when the wire is too short to be used for cutting the vegetation, a new wire must be inserted in the head and wound around the spool.

A particular class of brush cutters include inertial-type automatic wire release systems, more particularly, comprising a spool capable of rotationally decoupling from the outer casing and, due to the difference in rotation speed of the spool relative to the outer casing, the spool causes the wire to emerge outside the casing without it being necessary to stop the head.

Generally, such models include heads configured to release the wire by means of appropriate mechanical release mechanisms arranged inside the head.

Preferably, such brush cutters envisage an activation of the release by means of an activation button placed on the head itself and activatable by means of an impulsive movement against a surface of the activation button, even while the head is operationally operating.

Such types of models generally use internal combustion engines to supply the driving torque to the cutting head, as the motors are very practical in handling and resistant to shocks.

Additionally, such models include heads designed so as to allow the wire to be reloaded from the outside, allowing the wire to be inserted and wound onto the spool from the outside without the need to open the head. The reloading of the wire, which is of the manual type, involves inserting the wire through the same holes from which their operating exit is envisaged and windable on the inner spool by manually rotating a knob which rotates the spool relative to the outer casing.

A second type of brush cutters includes an automated wire release, comprising an automated wire release system.

Such a type of brush cutters use electric motors, which are at the same time more noiseless, lighter and less polluting.

Such brush cutters can envisage both an automatic release and loading of the wire in the head, where once inserted, the wire is automatically wound and retained by means of an appropriate automatic winding mechanism, for example powered by the electric motor itself.

The release is actuatable by the operator by means of a manual actuating device, e.g., in the form of a button arranged near the manual gripping member of the brush cutter, ensuring less effort on the part of the operator and envisaging a longer useful life of the head.

Disadvantageously, such a second type of systems generally involve rather complex winding and release mechanisms which generally entail a high cost of manufacturing and maintenance.

There are no models of brush cutters in the prior art which comprise inertial release mechanisms, which are simple and inexpensive to manufacture, compatible to be powered independently by electric motors or combustion engines, which can comprise an automatic wire release by means of manual actuation, e.g., push buttons or the like, and which at the same time can envisage for both a wire reloading from the outside without opening the casing.

In summary, the prior art does not have solutions which simultaneously comprise the features of both the first and second types and cover the respective shortcomings.

The technical task of the present invention is thus to provide a head for a brush cutter with automatic wire release which is capable of overcoming the drawbacks which have emerged from the prior art.

The technical object of the present invention is to provide a brush cutter head of easy and inexpensive construction, powered by means of an electric motor or combustion engine, with automatic wire release by means of an inertial mechanism.

A further technical object of the present invention is to provide a head that is light and easily manipulated and comprises a wire reloading system that is easily understood by an external operator.

A further technical object of the present invention is to provide a wire reloading method for a head comprising an inertial release mechanism that can be easily implemented by an external operator.

The stated technical task and the specified object are substantially achieved by a head for brush cutters comprising the features illustrated in the following claims.

In particular, the present invention presents a head for brush cutters intended to comprise a cutting wire adapted to rotate axially around an axis by means of a driving torque supplied by a drive shaft according to an operating direction of rotation.

The head comprises an outer casing, which is substantially cylindrical, internally hollow, extending around the aforementioned axis.

The casing comprises at least a first through eyelet and a second through eyelet, arranged preferably diametrically opposite such an axis A by means of which a first end portion and a second end portion of the wire emerge from the head.

The head further comprises a spool extending around such an axis and arranged rotationally coupled or couplable by means of a coupling device inside such an outer casing.

The spool is configured to be decoupled rotationally relative to the outer casing by means of a decoupling mechanism that is actuatable by an actuating device.

This decoupling mechanism is activated, for example, by means of a sudden acceleration of the rotational speed of the head.

The decoupling effect between spool and outer casing causes a temporary unwinding of the wire arranged around the spool.

The spool further comprises a substantially cylindrical base body. The spool further comprises at least one annular housing arranged perimetrically around the cylindrical body and around which the cutting wire is wound or windable.

The spool further comprises at least a first and a second opening, such openings being arranged in positions substantially diametrically opposite each other and connected by means of at least one through internal channel having an orientation at least partially radial relative to the above-mentioned axis and intended for the insertion of the wire.

Each opening is, crossed or crossable by a respective end portion of the wire with an orientation at least partially radial relative to the aforementioned axis.

The head for brush cutters is characterised in that it includes a reloading of the wire, whereby the wire is insertable inside the head from the outside by means of the first or the second opening, when such first and second openings are facing the first and second eyelets, respectively.

The facing condition occurs when at least one of the openings is aligned with a respective eyelet so as to favour the entry of the wire.

The reloading envisages a relative rotation of the spool that is discordant relative to the outer casing.

The head is further characterised in fact that it comprises a reloading device coupled with the spool and configured to rotate the spool relatively to the outer casing around the aforementioned axis to reload the wire on the spool.

The head is further characterised by comprising at least one reference arranged on the outer surface of the outer casing, in which at least one indicator and at least one reference are suitable for defining at least one logic and/or position correspondence that is detectable by a user to identify each first and second eyelets respectively facing each of the first and second openings.

The specified technical task and object are substantially achieved by a method for reloading the wire of a head according to one or more of the preceding claims, comprising several steps. The first step comprises reading the indicator by means of the interface device.

Thereafter it is envisaged to perform a relative rotation by means of the reloading device if there is no logic and/or position correspondence between the indicator shown by the interface device and the reference. The relative rotation is interrupted if there is a correspondence between the indicator shown by the interface device and the reference. In a configuration of correspondence between the indicator shown by means of the interface device and the reference, the wire is inserted inside the head by means of said first or second eyelet.

Following the insertion of the wire, said reloading device is operated to wind a quantity of the wire on the spool.

Further features and advantages of the present invention will become more apparent from the following indicative and therefore non-limiting description, of a preferred but not exclusive embodiment of a head for brush cutters as illustrated in the accompanying drawings in which.

Figures 1, 2:
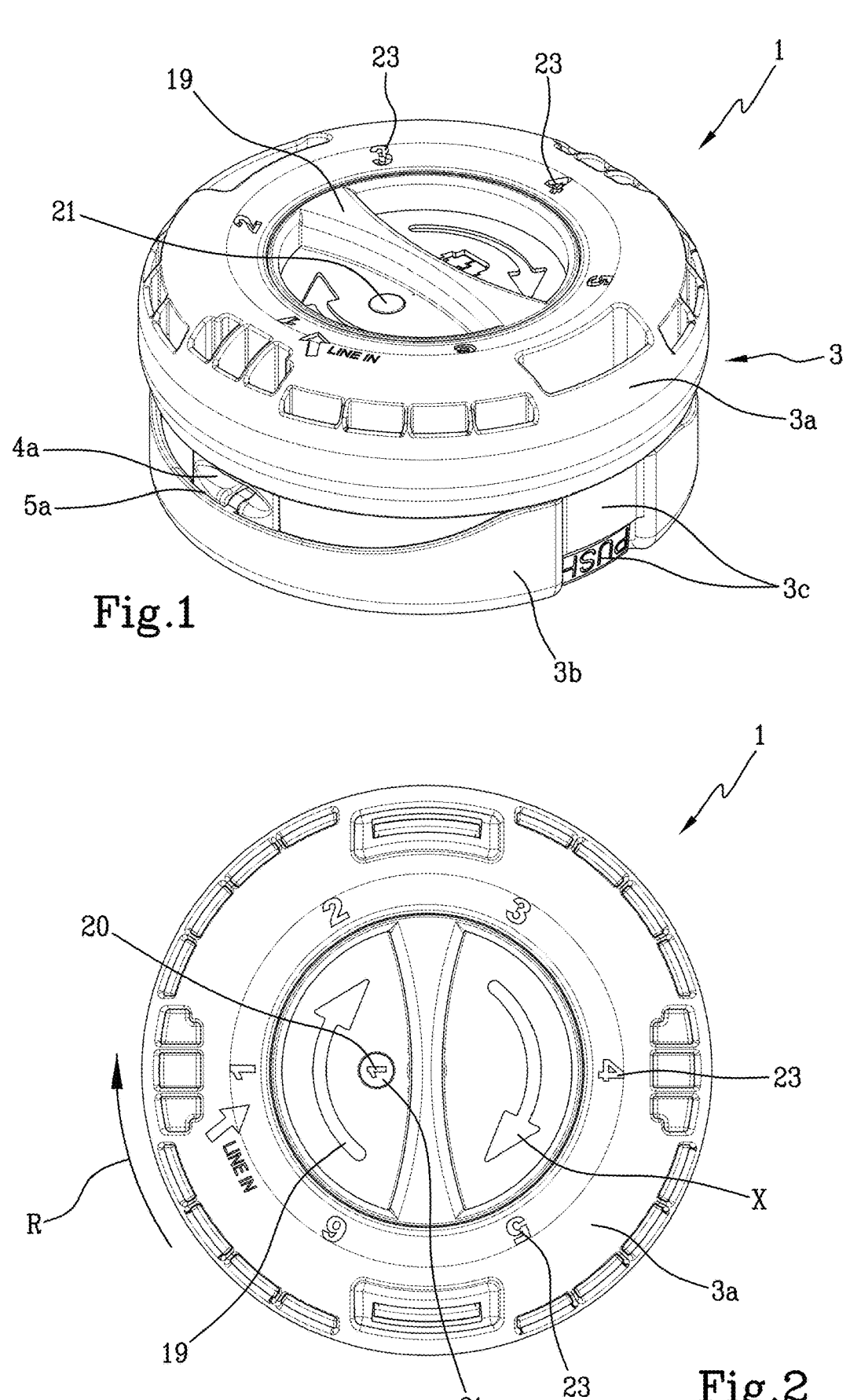
FIG. 1 is a depiction of a first embodiment of a head for brush cutters according to the present invention.
FIG. 2 is a top view of the head illustrated in FIG. 1 illustrating an arrangement of an indicator window arranged off-centre on a reloading knob.
Figure 3:
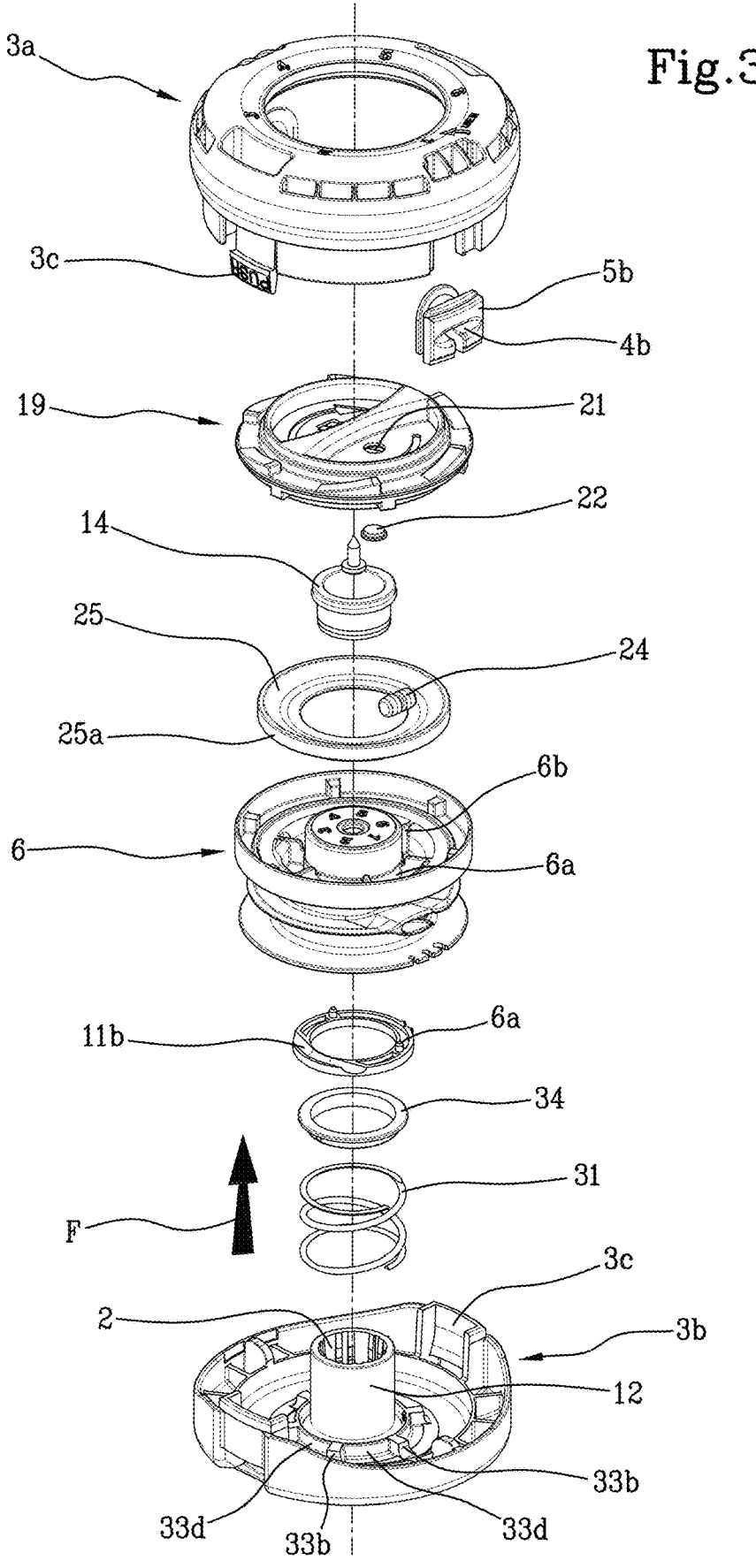
FIG. 3 is an exploded view of the head depicted in FIG. 1.
Figure 4:
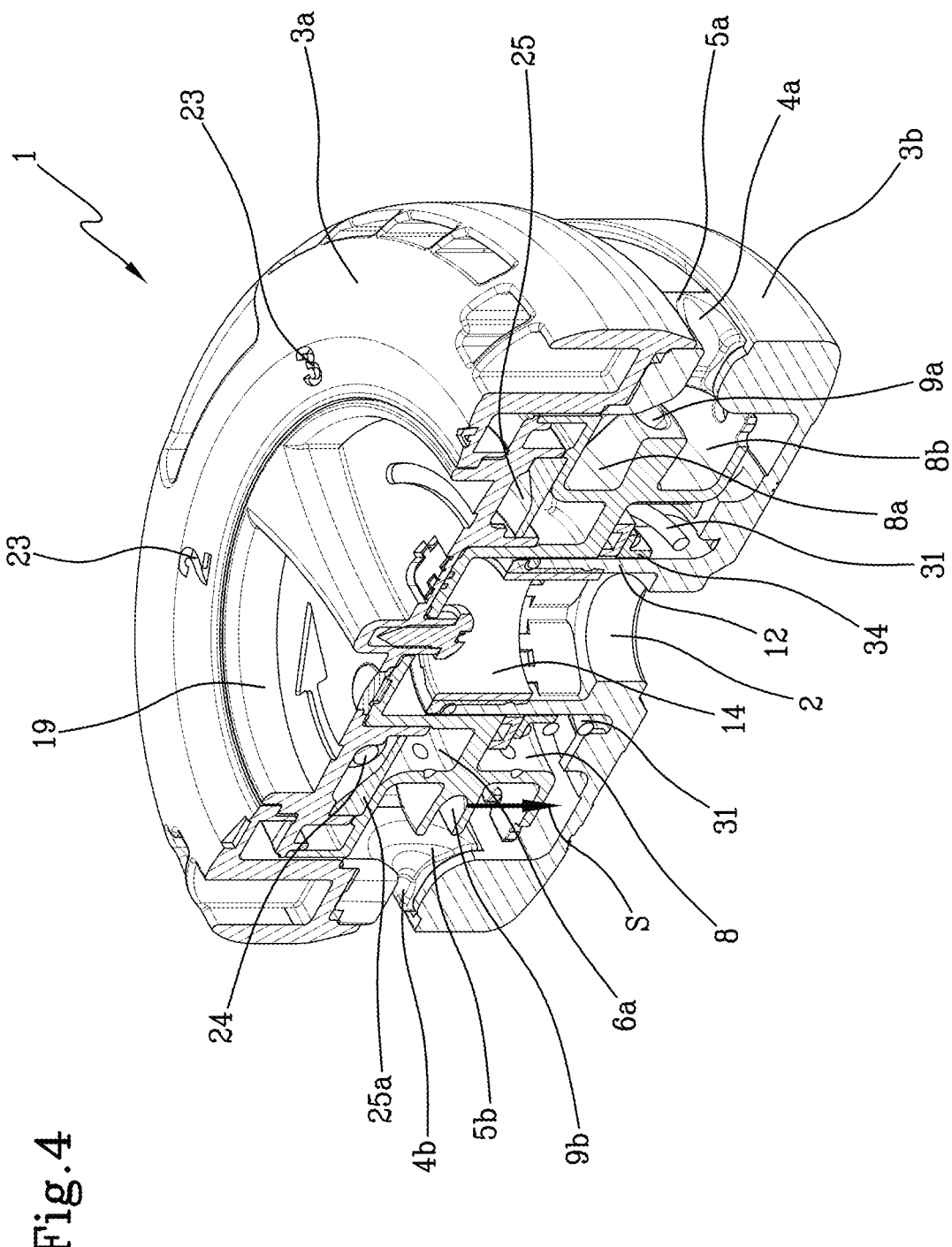
FIG. 4 is a sectional view of the head illustrated in FIG. 1.
Figure 5:
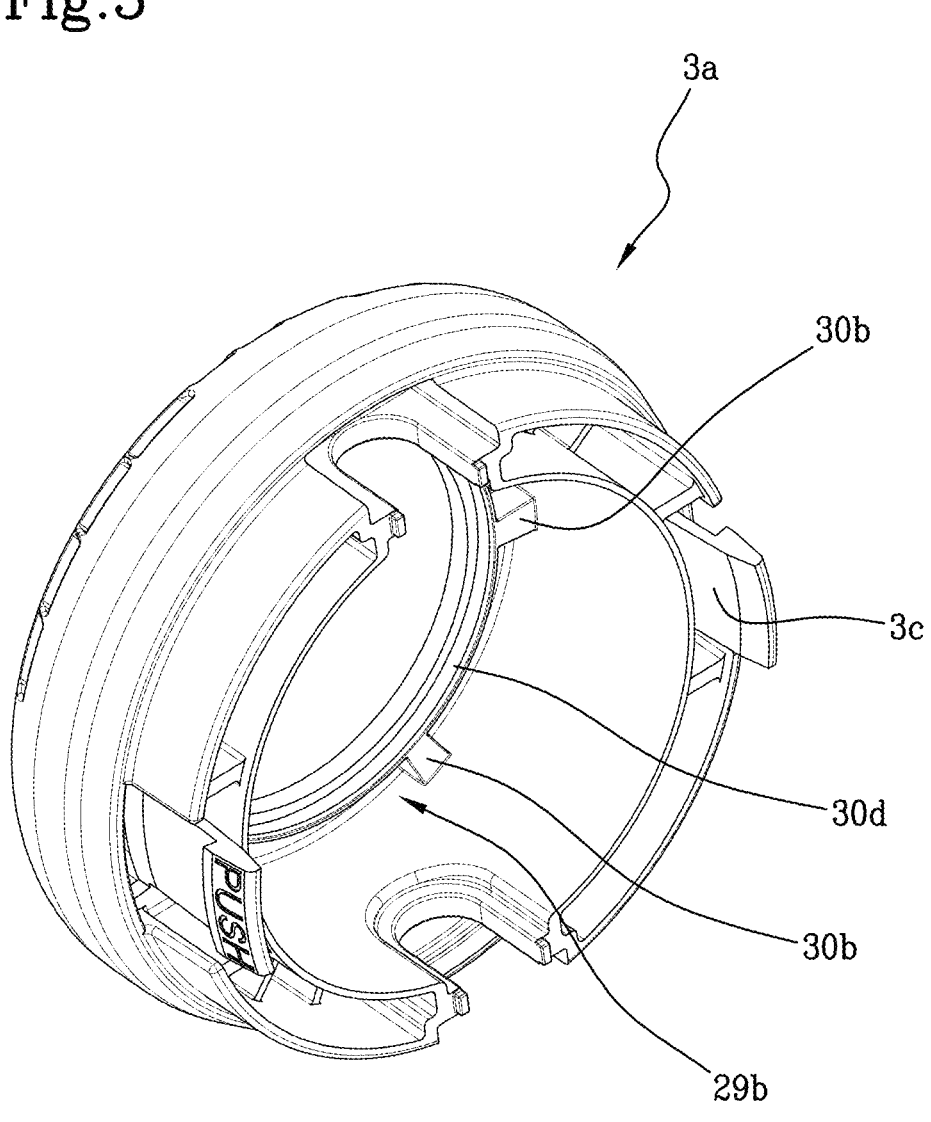
FIG. 5 is a depiction of a view of the inside of the lower section of the outer casing of the head illustrated in FIG. 1.
Figure 6:
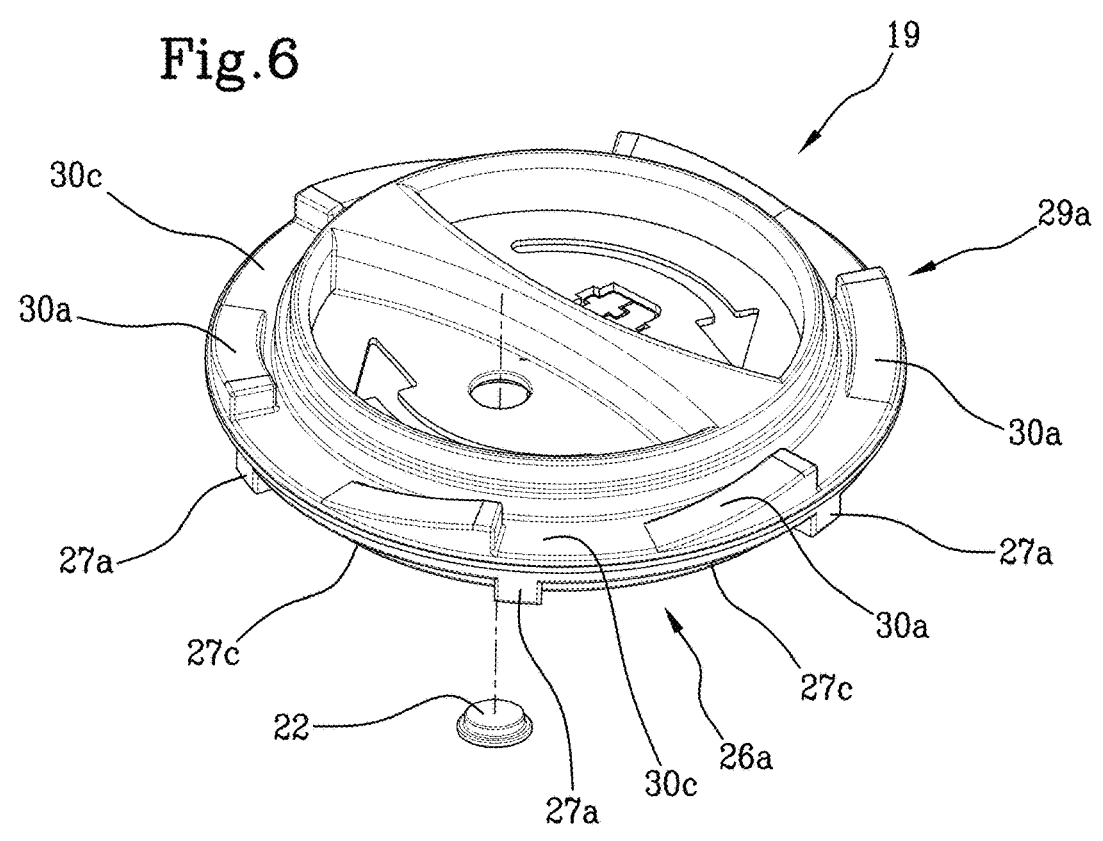
FIG. 6 is a representation of a view of a portion facing the outside of a knob made according to a preferred but not exclusive embodiment.
Figure 7:
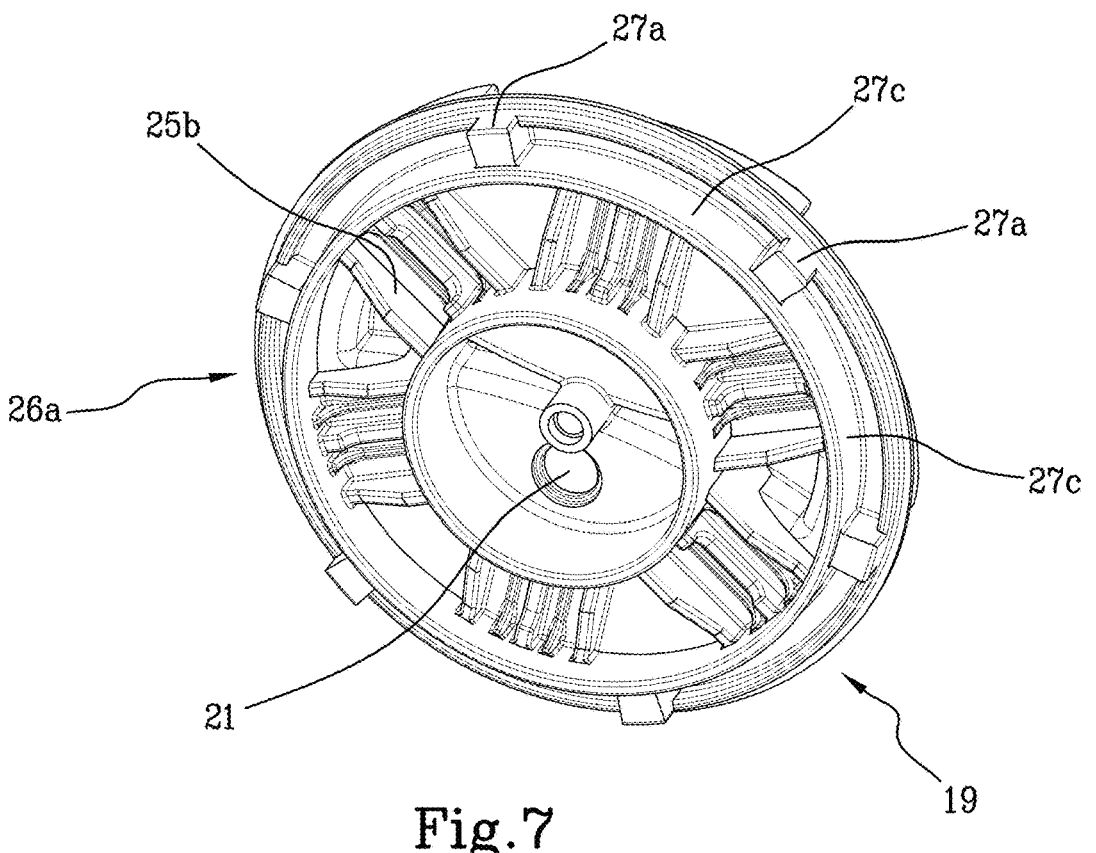
FIG. 7 is a depiction of a view of the portion facing the inside of the knob illustrated in FIG. 6, detailing the linear guides defining above a compartment used in the system for decoupling the spool relative to the outer casing.
Figure 8:
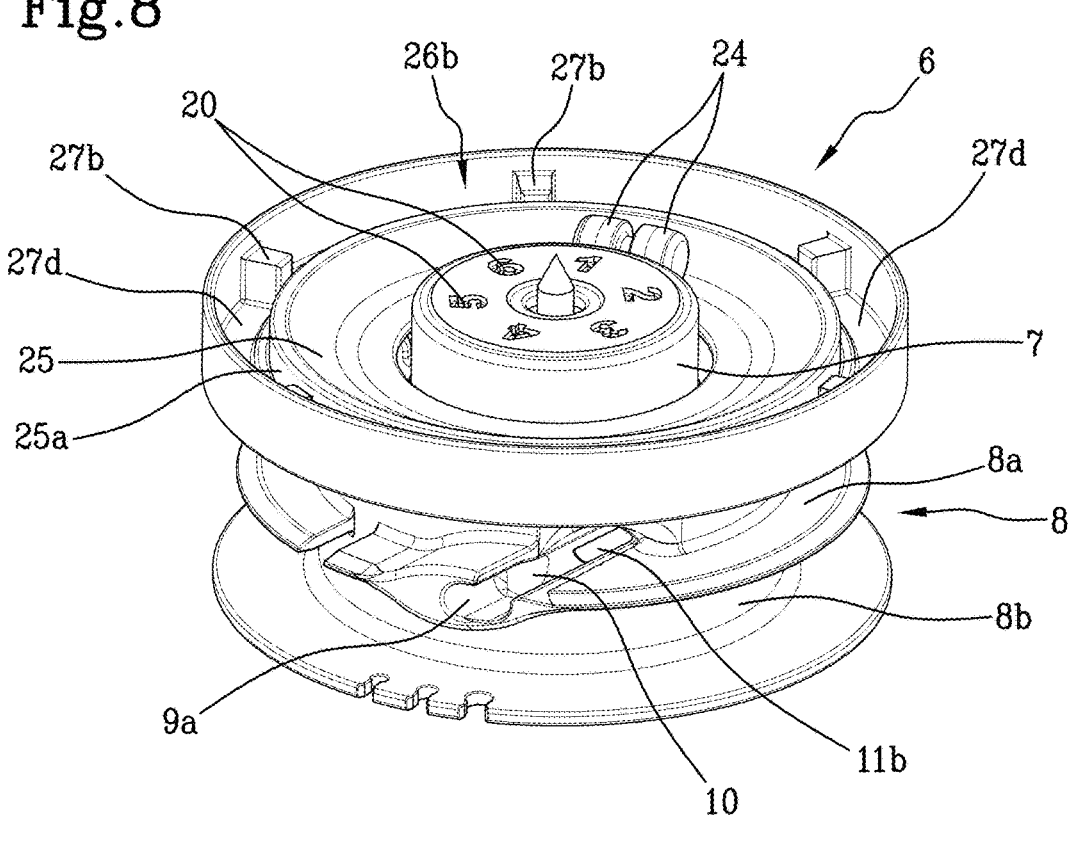
FIG. 8 is a depiction of a spool contained inside the outer casing of the head depicted in FIG. 1 with detail of an annular support defining the lower portion of a compartment provided with masses used in the system for decoupling the spool from the outer casing.
Figure 9:
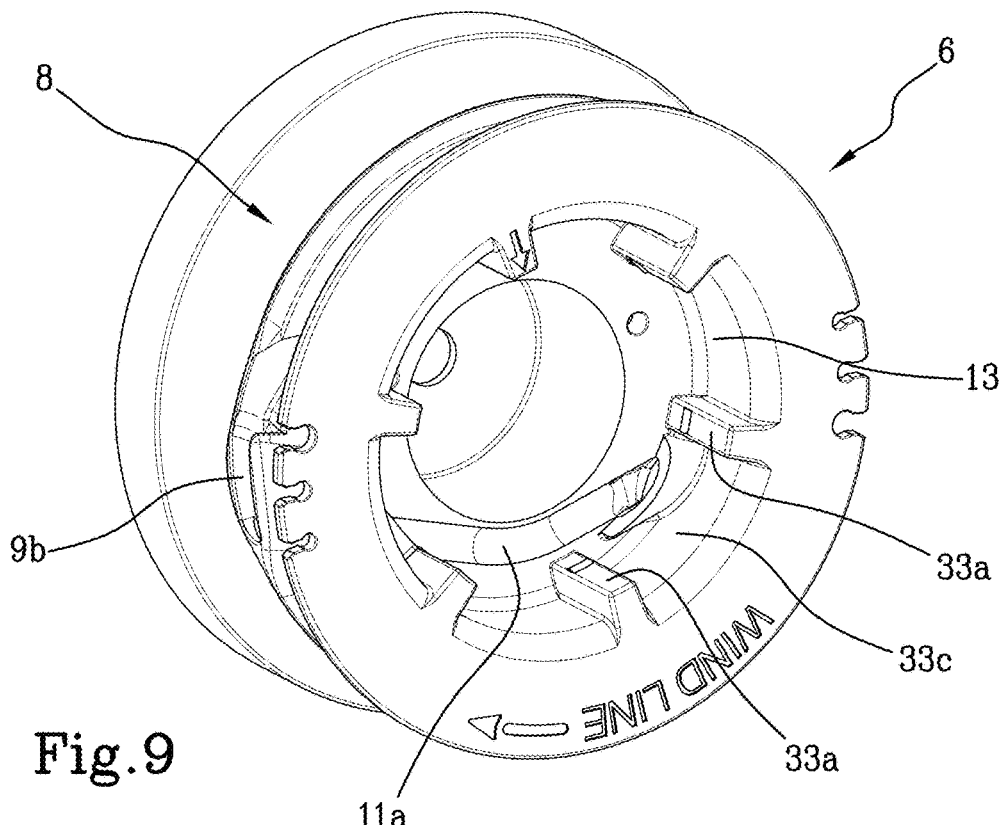
FIG. 9 is a lower view of the spool illustrated in FIG. 8, detailing the lower portion of the internal channel for the cutting wire.

In the present figures, a head for brush cutters (not illustrated) in accordance with the present invention is indicated in its entirety by the number 1.

The head 1 is intended to comprise a cutting wire (not illustrated). Such a cutting wire has a first end portion and a second end portion, each emerging outside the head 1 and intended to cut vegetation by means of the kinetic energy transmitted by the rotation of the head 1.

In particular, the head 1 extends axial-symmetrically around an axis "A". The head 1 has a seat 2 which is coupled or couplable in a rotationally integral manner along a direction substantially coincident with such an axis "A" to a drive shaft (not illustrated) of the brush cutter.

The head 1 has an operating rotation "R" by means of a driving torque supplied by the drive shaft around axis "A", rotated by a suitable power supply motor (not illustrated), preferably but not exclusively of the electric type.

The brush cutter envisages that the head 1 reach a sufficiently close distance from the ground or cutting area, in which the head is preferably oriented so that the axis "A" is substantially perpendicular relative to the ground or to the cutting area.

The head 1 comprises an outer casing 3. Such an outer casing 3 is substantially cylindrical and internally hollow. The outer casing 3 extends around the axis "A". The outer casing 3 is preferably made of at least one lower section 3a and one upper section 3b, mutually and integrally connected by means of suitable retaining members 3c, preferably coupled or couplable by interlocking.

Preferably, the lower section and the upper section 3a, 3b are connected or connectable along a plane transverse to the axis "A" to advantageously facilitate the opening of the casing 3 so as to have access to the internal components.

Alternative embodiments not illustrated in the present figures can envisage more than two sections.

The casing 3 comprises at least a first through eyelet 4a and a second through eyelet 4b, preferably arranged diametrically opposite relative to the axis "A". By means of such a first through eyelet 4a and such a second through eyelet 4b, a first end portion and a second end portion of a wire emerge outside the head 1, respectively. Such first and second eyelets 4a, 4b can be directly obtained in the outer casing or obtained on corresponding auxiliary components 5a, 5b integrable or integrated integrally with the outer casing 3.

The head 1 further comprises a spool 6 arranged inside the outer casing 3. The spool 6 extends around the axis "A" and is rotationally coupled or couplable to the outer casing 3.

The spool 6 comprises a base body 7 which is substantially cylindrical and at least one annular housing 8 arranged perimetrically around such a base body 7, around which such a wire is wound or windable.

With reference to the present figures, preferably, such an annular housing 8 comprises a first flanged guide 8a and a second flanged guide 8b arranged perimetrically adjacent around the base body 7.

The spool 6 further comprises at least a first and a second opening 9a, 9b arranged in positions substantially diametrically opposite each other. Such openings 9a, 9b are connected to each other by means of at least one internal through channel 10 having an orientation preferably at least partially radial relative to such an axis "A" and intended for the insertion of the wire.

Operationally, the wire is inserted in such an internal channel 10 having the first and the second terminal portion emerging respectively from such a pair of openings 9a, 9b and, simultaneously, from such first and second eyelets 4a, 4b outside the outer casing 3.

Additionally, each opening 9a, 9b communicates with the first or with the second flanged guide 8a, 8b, respectively.

With reference to the present figures, the head 1 comprises a hollow cylinder 12 made in a single piece with the outer casing 3 and oriented towards the inside of the outer casing 3, preferably on the upper section 3b, insertable or inserted inside a suitable cylindrical cavity 13 made inside the spool 6.

The hollow cylinder 12 is at least partially inserted sliding rotationally and axially along the axis "A", inside the cylindrical cavity 13. In particular, both the hollow cylinder 12 and the cylindrical cavity 13 are arranged centred on the axis "A".

The hollow cylinder 12 is configured to define the aforementioned seat 2. The housing 2 is made in the form of a recess with a substantially cylindrical geometry towards the inside of the outer casing 3 and the hollow cylinder 12, accommodating a final end of the drive shaft therein. Preferably, the seat 2 has suitable reliefs for an interlocking connection with such a drive shaft.

In the embodiments illustrated in the present figures, the head 1 comprises a first bushing 14 insertable inside the housing 2 with the purpose of increasing the frictional grip with the drive shaft.

Operationally, the spool 6 is rotationally coupled to the casing 3 by means of a coupling mechanism which allows both to rotate integrally and at the same speed according to the operating rotation "R".

The spool 6 is further configured to decouple rotationally, for a short time, relative to the outer casing 3 by means of a decoupling mechanism.

The rotational decoupling of the spool 6 relative to the outer casing 3 allows differentiated reciprocal rotations. In particular, the spool 6 no longer undergoes the driving torque imparted by the drive shaft and consequently rotates by inertia. It is observed that even during decoupling, the spool 6 rotates in a concordant manner relative to the outer casing 3. Such differentiated rotations allow a temporary unwinding of the wire, which emerges from inside the head 1 by a predetermined length, such as to allow the vegetation cutting to continue.

In particular, during the decoupling of the spool 6 relative to the outer casing 3, such first and second eyelets 4a, 4b become misaligned relative to such first and second openings 9a, 9b. Such a misalignment causes the wire to partially unwind from the spool 6.

Such a decoupling mechanism is actuatable by an actuating device (not illustrated), such as a button which, when pressed by the operator, activates the decoupling of the spool 6 relative to the outer casing 3, respectively, the spool 6 rotating by inertia according to a lower rotational speed relative to the rotational speed "R" of the outer casing.

Alternative embodiments in which the relative rotation "X" is performed automatically, such as by means of motor powering the rotation of the head 1, are not excluded.

To avoid limiting the reciprocal rotation between the hollow cylinder 12 and the cylindrical cavity 13, the internal channel 10 passing through the spool 6 is made so as to have a curvilinear extension which circumvents the surface of reciprocal coupling between the hollow cylinder 12 and the cylindrical cavity 13.

Preferably, the spool 6 is integrated by an annular support 6a. A first part of the internal channel 10 is defined by a first recess 11a obtained on the spool itself, preferably arranged inside the cylindrical cavity 13, while a second part of the internal channel 10 is defined by a second recess 11b obtained on the annular support 6a, such an annular support 6a being inserted in such a cylindrical cavity 13, centred and aligned with respect to the axis "A".

The head 1 includes a wire reloading in which the wire can be inserted inside head 1 from the outside by means of such first or second through eyelets 4a or 4b. In particular, the reloading of the wire includes inserting one among the first or the second end portions of the wire first through the first or the second eyelet 4a or 4b arranged on the outer casing 3 and then through the first or the second opening 9a or 9b of the spool 6. Once inserted, the wire passes through the entire internal channel 10 inside the spool 6, emerging through the corresponding opposite opening 9b or 9a and the corresponding opposite eyelet 4b or 4a.

The reloading further envisages that the wire is wound around the spool 6, and in particular, around the annular housing 8, by means of a relative rotation "X" of the spool 6 which is discordant relative to the outer casing 3.

Discordant rotation means that the spool 6 rotates in a discordant direction relative to the outer casing 3, as opposed to the concordant direction of rotation of the spool 6 during operation or during the decoupling relative to the outer casing 3.

The head 1 comprises a reloading device coupled with the spool 6 and configured to rotate the spool 6 relatively to the outer casing 3 around the rotation axis "A" to reload the wire on the spool 6.

The reloading envisages that the insertion of the wire is only possible when at least one of the first and second openings 9a, 9b is facing a respective first or second eyelet 4a, 4b.

When at least one opening 9a or 9b is facing the respective eyelet 4a or 4b, a wire entry condition is identified. After the insertion of the wire, thanks to the memory of the curved shape thereof, the wire passes through the channel 10 and emerges from the other opening and the corresponding eyelet, opposite the two facing for wire insertion, even if they are not aligned. That is, the wire is loaded according to a known manner described in patent EP1894459 of the Applicant.

In particular, it is observed that during each decoupling between spool 6 and outer casing 3, the spool 6 is arranged according to a random angular position relative to the outer casing 3 itself.

It follows that the first and second openings 9a, 9b are also generally misaligned with the first and second eyelets 4a, 4b respectively.

Before proceeding with the insertion of the wire, the spool 6 and the outer casing 3 must be respectively facing, or, in other words, facing at least one of the respective first or second openings 9a, 9b at a respective first or second eyelet 4a, 4b.

Preferably, such facing can be carried out by means of the above-mentioned reloading device.

Even more preferably, the reloading device envisages carrying out such realignment by means of the same relative rotation "X" of the spool 6 relative to the outer casing 3, even in the absence of wire.

To know the respective angular orientation between spool 6 and outer casing 3, the head 1 comprises an interface device.

The interface device is configured to show, outside the head 1, at least one indicator 20 identifying a relative angular position of the spool 6 relative to the casing 3.

The head further comprises at least one reference 23 arranged on the outer surface of the outer casing 3.

Such an at least one indicator 20 and at least one reference 23 are suitable for defining at least one logic and/or position correspondence that is detectable by a user to identify each first and second eyelets 4a or 4b respectively aligned with each of said first and second openings 9a, 9b.

In particular, a logic correspondence is understood as a user visually recognising a predetermined logical association between an indicator 20 and at least one reference 23 and extrapolating when any correspondence between an indicator 20 and a reference 23 coincides with a first or second eyelets 4a or 4b respectively facing one of said first or second openings 9a, 9b.

Position correspondence is understood as there being a positional correspondence, e.g., by physical alignment, between an indicator 20 and a reference 23 that corresponds to a first or second eyelets 4a or 4b respectively facing one of first or second openings 9a, 9b.

With reference to the embodiment illustrated in the attached figures, the device 1 comprises a knob 19 which is rotatable relatively to the outer casing 3 and arranged in a lower portion of the head 1.

In particular, the knob 19 is arranged opposite relative to the outer casing 2 accommodating the drive shaft, in particular on the lower section 3b of the casing 3.

According to the embodiment illustrated in the present figures, the knob 19 preferably has an axial-symmetrical extension around the axis "A".

The knob 19 is integrated rotationally movable in the outer casing 3, in particular in the lower section 3a of the outer casing 3.

Preferably, the surface of the knob 19 facing the outside of the head is substantially aligned with the surface of the outer casing comprised in the lower portion 3a portion of the head.

Such a knob 19 is manually actuatable by an operator and allows to carry out such a relative rotation "X".

The knob 19 is rotationally coupled or couplable with the spool 6 and configured to rotate together with the spool 6 relative to the outer casing 3 when such a relative rotation "X" is carried out.

In particular, in the embodiment illustrated in the present figures, the coupling mechanism comprises a first toothed connection, arranged between the spool 6 and the knob 19 and a second toothed connection, arranged between the knob 19 and the outer casing 3, such that the knob 19 defines an intermediate rotational connecting member between the outer casing 3 and the spool 6.

The first toothed connection comprises a first toothed crown 26a, made integral with the spool 6, and a second toothed crown 26b made integral with the knob 19. The first and second toothed crowns 26a, 26b extend respectively around the axis "A" and comprise respectively primary teeth 27a and secondary teeth 27b interspersed respectively with primary gaps 27c and secondary gaps 27d.

The primary teeth 27a of the first crown 26a and the secondary teeth 27b of the second crown 26b are arranged circumferentially around the axis "A" and reciprocally protruding along a direction parallel to the axis "A". The teeth 27a of the first crown 26a are insertable in the corresponding gaps 27d of the second crown 26b and teeth 27b of the second crown 26b are insertable and removable in the corresponding gaps 27c of the first crown 26a, defining the rotational coupling between spool 6 and knob 19, respectively.

The decoupling between spool 6 and knob 19 envisages that such first and second toothed crowns 26a, 26b decouple by means of a relative translation along a direction substantially parallel to the axis "A", sufficient to relatively decouple each tooth-gap pair.

Advantageously, such a first toothed connection defines a number of angular engagement positions equal to the corresponding number of tooth-gap pairs consisting of one between the primary or secondary teeth 27a, 27b and one between the corresponding primary or secondary gaps 27c, 27d of each toothed crown.

When the spool 6 decouples from the outer casing 3 to carry out the wire release, the spool 6 is also decoupled from the knob 19.

During the decoupling between spool 6 and outer casing 3, the knob 19 is instead rotationally coupled to the outer casing 3. Following the decoupling, the spool 6, when it is coupled back to the outer casing 3, is arranged according to a variable angular orientation with respect to the knob 19.

With the exception of the step for decoupling the spool 6 from the casing 3, the knob 19 is always integrally engaged with the spool 6.

The second toothed connection is instead arranged between the knob 19 and the outer casing 3, transmitting the operating rotation "R" from the outer casing 3 to the spool 6.

The second toothed connection comprises a first toothed assembly 29a, made integral with the knob 19, and a second toothed assembly 29b, made integral with the outer casing 3, in particular with the first section 3a integrating the knob 19.

Such first and second toothed assemblies 29a, 29b also have a substantially circular extension around the axis "A", comprising respectively primary toothed protrusions 30a and secondary toothed protrusions 30b, interspersed with corresponding primary depressions 30c and secondary depressions 30d, arranged circumferentially around the axis "A" and reciprocally protruding along a direction parallel to the axis "A".

The toothed protrusions 30a of the first crown 29a are insertable in the corresponding depressions 30d of the second crown 29b and the toothed protrusions 30b of the second crown 29b are insertable in the corresponding depressions 30c of the first crown 29a.

The first and second toothed assemblies 29a, 29b are configured to be mutually engaged and engageable and allow the spool 6 and the outer casing 4 (possibly by means of the intermediation of the knob 19) to be rotationally couplable.

The head 1 envisages that at least one of the first toothed assembly and the second toothed assembly 29a and/or 29b comprises primary toothed protrusions 30a or secondary toothed protrusions 30b made in the form of a ramp, allowing a mutual sliding of the first and second toothed assemblies 29a, 29b in the discordant rotation direction "X" and no mutual sliding in the concordant rotation direction "R".

According to the embodiment illustrated in the present figures, the secondary protrusions 30b arranged on the knob 19 have the aforementioned ramp profile.

The ramp profile has a long inclined side only along one flank of the tooth, allowing the knob 19 to rotate relative to the outer casing 3. The knob 19 being engaged to the spool 6 by means of such a first toothed connection, it also transmits such a rotation "X" to the spool 6 and allows the winding of the wire on the spool 6.

On the contrary, during the operating rotation "R", such a sliding is not allowed, ensuring that the knob 19 can undergo such a rotation "R" from the outer casing 3 and transmit it to the spool 6.

According to the embodiments illustrated in the present figures, the interface device comprises a transparent or through window 21 enabling a portion of the spool 6 to be viewed from outside the outer casing 3.

Alternatively, the head can envisage for the knob to comprise an at least partially transparent sub-portion, in place of the window 21.

Alternatively, the head is totally transparent, allowing to show at least one section of the spool arranged substantially below said knob.

With reference to the embodiment illustrated in FIG. 2, the window 21 is made on the knob 19 in an off-centre manner relative to the axis "A".

Such a window 21 can incorporate a transparent or magnifying lens 22. The indicator 20 is applied or made on the spool 6 and arranged and/or configured to be visible from the outside at a relative preset angular orientation between the spool 6 and the knob 19.

Preferably, the interface device comprises a plurality of indicators 20, applied or made on the spool 6 and angularly distributed around the axis "A", each indicator 20 being visible from the outside, preferably exclusively, at a relative respective preset angular orientation between the spool 6 and the knob 19.

Preferably, such indicators 20 are in a number corresponding to the number of angular positions of reciprocal engagement between the spool 6 and the knob 19.

It can be seen that by carrying out said relative rotation 'X' by manipulating the knob 19, the knob rotates, but along with it, the window or any transparent sub-portion of the knob 19 also rotates.

Using at least one reference 23, a correspondence between an indicator 20 and a reference 23 allows to recognise when each of the first and second eyelets 4a and 4b are facing each of the first and second openings 9a and 9b correspondingly.

In particular, the presence of the outer reference 23, for example arranged on the outer casing 3 immediately near the area where the window 21 is arranged, or from which it is possible to observe the reference 23 by means of the transparent portion of the knob 19, simplifies the alignment speed, as it allows an immediate visual feedback by an operator of a possible logic or position correspondence between the indicator 20 and the reference 23.

Preferably, to further speed up the identification of such a correspondence, the head 1 can comprise a plurality of references 23 arranged on the outer surface of the outer casing 3.

By way of example, the reference 23 can be a distinctive sign facilitating identification of the position of one or both of the eyelets 4a or 4b on the outer casing 3.

Preferably, the number of references 23 is in a number corresponding to the number of said reciprocal angular positions between the spool 6 and the knob 19.

That is, the number of references 23 and indicators 20 corresponds to the number of stop positions of the spool relative to the knob following each reciprocal decoupling.

Even more preferably, each reference 23 is visually identical to a respective indicator 20.

Each reference 23 and/or each indicator 20 is defined by a graphic and/or chromatic symbol. By way of example, such a graphic and/or chromatic symbol can comprise letters, numbers, colours, geometric shapes or a combination thereof.

According to an embodiment not illustrated in the present figures, the head comprises a window 21 arranged on the knob 19 at the axis "A" around which the spool 6 is rotating. Preferably, the window 21 is centred on the axis "A".

The spool 6 in turn comprises a single indicator 20.

The indicator 20 only varies its orientation relative to one or more, preferably a pair of references 23 arranged on the outer casing 3, where each reference is aligned with the first and second eyelets 4a and 4b, respectively.

The indicator, by way of example, is a double arrow indicating the positioning of the first and second openings 9a and 9b.

The correspondence of the double arrows constituting the reference 23 with the pair of references 23 indicates the first and/or second eyelets 4a and 4b facing the first and/or second openings 9a and 9b.

According to a further alternative embodiment not illustrated in the attached figures, the window 21 is made on the outer casing 3 itself or a possible portion of the outer casing 3 made transparent. One or more indicators 20 can be visible in succession through such a window 21 as a function of a preset relative angular orientation between the spool 6 and the outer casing 3. A reference 23 can be arranged near such a window or transparent portion, allowing a visual identification between a logic correspondence between at least one indicator 20 and reference 23.

According to the embodiment illustrated in the present figures, the decoupling mechanism is integrated in the outer casing 3 and is configured to be activated by means of a change in the speed of the head 1.

In particular, the decoupling mechanism comprises at least one mass 24 arranged inside the outer casing 3 in an eccentric position relative to the axis "A", movable along at least one radial direction relative to the axis "A" due to the centrifugal force generated on the mass 24 by the rotation of the head 1.

The activation of the translation of the mass 24 is caused by an increase in the rotation speed of the head 1, which causes the mass 24 to move radially away from the axis "A".

Preferably, the decoupling mechanism comprises a plurality of masses 24. Even more preferably, each mass 24 is arranged reciprocally equidistant relative to the next one around the axis "A".

Each of the masses 24 is arranged to slide in a compartment 25 with a decreasing cross section away from the axis "A" and obtained between the spool 6 and the outer casing 3 and/or the knob 19.

In the embodiment illustrated in such figures, the spool 6 has an annular cavity 6a between the base body 7 and the annular housing 8, arranged opposite the spool and tracing the cylindrical cavity 13. Such an annular cavity 6a is provided with suitable supports 6b on which an annular support 25a rests or is integrated. The compartment 25 is interposed between the knob 19 and the annular support 25a. The annular support 25a has an annular geometry and extends around the axis "A" and is arranged interposed between the spool 6 and the knob 19. The annular support 25a further has a radially increasing section away from the axis "A".

The masses 24 are channelled into a linear path by means of suitable linear guides 25b arranged on the knob 19 and facing the annular support 25a, oriented radially with respect to the axis "A".

Preferably, there are at least two linear guides 25*b* arranged diametrically opposite relative to the axis "A".

Given the decreasing cross section of the compartment 25, the radial displacement of the mass 24 causes a lift "S" substantially parallel to the axis "A" of the spool 6 relative to the outer casing 3, against the action of a contrasting elastic element 31, rotationally decoupling the spool 6 from the outer casing 3.

In particular, since in the embodiment illustrated in the present figures, the knob 19 is integrated and/or integrable in the outer casing 3 and the compartment 25 is obtained between the spool 6 and the outer casing 3 and/or said knob 19, the lift "S" decouples the spool 6 relative to the knob 19.

In particular, during the lift "S", the primary and secondary teeth 27*a*, 27*b* of said first toothed connection move away from each other in a direction parallel to the lift "S", reciprocally decoupling.

The elastic element 31 is configured to exert a thrust action "F" opposite such a lift "S" of the spool 6 relative to the outer casing 3. Such a thrust action "F" tends to bring the spool 6 into a rotational coupling condition with the outer casing 3, when the actuating mechanism is not actuated. Preferably, the elastic element 31 is made in the form of a helical spring interposed between the hollow cylinder 12 and the cylindrical cavity 13, comprising a first support 31*a* against the spool 6 and a second support 31*b* against the outer casing 3.

Preferably, the head comprises at least a second bushing 34, having an "L" section, supporting the elastic element 31 and interposed between the spool 6 or the outer casing 3, in particular being arranged around the hollow cylinder 12 and supporting the lower support 25*a*.

Preferably, to further limit the duration of the lift "S" and stop the rotational decoupling between the spool 6 and the outer casing 3, the head 1 comprises a stop mechanism, preferably made in the form of a third toothed connection, arranged between the spool 6 and the outer casing 3. In particular, such a stop mechanism comprises primary protrusions 33*a* arranged on the spool 6 and secondary protrusions 33*b* arranged on the outer casing 3. Such primary and secondary protrusions 33*a*, 33*b* are interspersed by primary spaces 33*c* and secondary spaces 33*d*, respectively. Due to the lift "S", such primary and secondary protrusions 33*a*, 33*b*, normally decoupled, approach each other until they interact and each of the primary or secondary protrusions 33*a* or 33*b* inserts into a corresponding secondary or primary space 33*d* or 33*c*.

According to the present embodiment, such a third toothed connection is arranged inside the outer casing 3, preferably at the opposite end along the axis "A" relative to the first and second toothed connections. In particular, the secondary protrusions 33*b* and the second plurality of depressions 33*d* are made near the junction between the hollow cylinder 12 and the upper section 3*b*, in which the inner surface of the outer casing 3 is exploited as a stop surface with respect to the lift "S".

In the embodiments illustrated in the present figures, the arrangement of the primary and secondary protrusions 33*a* and 33*b* is circumferential around the axis "A" and reciprocally protrusions along a direction parallel to the axis "A".

The present invention also provides a method for reloading the wire of the head 1. The method for reloading the wire comprises a succession of steps. The first step is to read the indicator 20 by means of the interface device. Then it is proceeded with performing said relative rotation "X" by means of the reloading device if there is no logic and/or position correspondence between the indicator 20 shown by the interface device and the reference 23. The relative rotation "X" is interrupted if there is a correspondence between the indicator 20 shown by the interface device and the reference 23. In a configuration of correspondence between the indicator 20 shown by means of said interface device and the reference 23, the wire is inserted inside the head 1 by means of said first or second eyelet 4*a* or 4*b*. Following the insertion of the wire, said reloading device is operated to wind a quantity of said wire on the spool 6. Preferably, at the end of reloading the head 1, a first and a second end of the wire are partially emerging from the first and second eyelets 4*a* or 4*b*.

The invention claimed is:

1. A head for a brush cutter (1), intended to comprise a cutting wire and having an operating rotation (R) around an axis (A) by means of a driving torque (C) supplied by an external rotating shaft, comprising:

an outer casing (3), which is substantially cylindrical, internally hollow, extending around said axis (A) and comprising at least a first through eyelet (4*a*) and a second through eyelet (4*b*), arranged preferably diametrically opposite said axis (A) by means of which a first end portion and a second end portion of said wire emerge from said head (1), a spool (6) extending around said axis (A) and rotationally coupled or couplable by a coupling mechanism inside said outer casing (3) and configured to be decoupled rotationally from said outer casing (3) by means of a decoupling mechanism that is actuatable by an actuating device permitting partial unwinding of said wire, said spool (6) comprising:

a base body (7) which is substantially cylindrical;

at least one annular housing (8) arranged perimetrically around said base body (7) and around which said wire is wound or windable;

at least a first opening (9*a*) and a second opening (9*b*) that are arranged in positions substantially diametrically opposite each other and connected by means of at least one internal channel (10) intended for the insertion of said wire;

wherein said head (1) provides for reloading the wire, wherein said wire is insertable inside said head (1) from the outside by means of said first or second eyelet (4*a* or 4*b*), when said first and second eyelets (4*a* and 4*b*) face respectively said first and second openings (9*a*, 9*b*), said reloading involving a relative rotation (X) of said spool (6) that is discordant relative to said outer casing (3); and said head (1) comprising:

a reloading device coupled with the spool (6) and configured to rotate the spool (6) relatively to the outer casing (3) around the axis (A) to reload said wire on the spool (6);

an interface device configured to show, outside the head (1), at least one indicator (20) identifying a relative angular position of said spool (6);

at least one reference (23) arranged on the external surface of the outer casing (3); and wherein said at least one indicator (20) and said at least one reference (23) are suitable for defining at least one logic and/or position correspondence that is detectable by a user to identify each first and second eyelets (4*a* or 4*b*) respectively facing each of said first and second openings (9*a*, 9*b*).

2. The head (1) according to claim 1, wherein said reloading device comprises a knob (19) that is rotatable relatively to the outer casing (3) and arranged in a lower portion of the head (1).

3. The head (1) according to claim 2, wherein said knob (19) is integrated rotationally movable in the outer casing (3).

4. The head (1) according to claim 3, wherein the externally facing surface of said knob is substantially aligned with the surface of the outer casing comprised in the lower portion of the head.

5. The head (1) according to claim 2, wherein said coupling mechanism comprises a first toothed connection, arranged between the spool (6) and the knob (19) and a second toothed connection arranged between the knob (19) and the outer casing (3), such that said knob (19) defines an intermediate rotational connecting member between the outer casing (3) and the spool (6).

6. The head (1) according to claim 2, wherein said interface device comprises a window (21) made on the knob (19).

7. The head (1) according to claim 6, wherein said indicator (20) is applied or made on the spool (6) and arranged and/or configured to be visible from the outside at a relative preset angular orientation between the spool (6) and the knob (19).

8. The head (1) according to claim 7, wherein said interface device comprises a plurality of indicators (20), applied or made on the spool (6) and angularly distributed around said axis (A), each indicator (20) being visible individually from the outside at a relative respective preset angular orientation between the spool (6) and the knob (19).

9. The head (1) according to claim 8, wherein said knob (19) and said spool (6) are connected together by a first toothed connection configured to make a plurality of different angular positions of reciprocal engagement between the spool (6) and the knob (19), and wherein the number of said indicators (20) corresponds to the number of said angular positions of reciprocal engagement.

10. The head (1) according to claim 9, comprising a plurality of references (23) arranged on the outer surface of the outer casing (3) and in a number corresponding to the number of said reciprocal angular positions between the spool (6) and the knob (19).

11. The head (1) according to claim 1 wherein said at least one reference (23) is visually identical to said at least one indicator (20).

12. The head (1) according to claim 1, wherein said at least one reference (23) and/or said at least one indicator (20) is defined by a graphic and/or chromatic symbol.

13. The head (1) according to claim 1, wherein said decoupling mechanism is configured to be actuated by a variation of the angular speed of the spool (6) relative to the outer casing (3).

14. The head (1) according to claim 12, wherein said decoupling mechanism comprises at least one mass (24) arranged inside the outer casing (3) in a position that is eccentric with respect to the axis (A), which is movable along at least one direction radial to the axis (A) due to the centrifugal force generated on the mass (24) by the rotation of the head (1); said mass (24) being arranged to slide in a compartment (25), said compartment (25) having a cross section that decreases moving away from the axis (A) and being obtained between said spool (6) and said outer casing (3), such that a radial movement of the mass (24) inside the compartment causes a lift(S) that is substantially parallel to the axis (A) of said spool (6) with respect to said outer casing (3), against the action of a contrasting elastic element (31), decoupling rotationally said spool (6) from said outer casing (3).

15. A method for reloading the wire of a head (1) according to claim 1, comprising the steps of:

reading the indicator (20) by means of said interface device;

performing said relative rotation (X) by means of said reloading device if there is no logic and/or position correspondence between the indicator (20) shown by said interface device and said reference (23);

interrupting said relative rotation (X) if there is a correspondence between the indicator (20) shown by said interface device and the reference (23);

in a configuration of correspondence between the indicator (20) shown by means of said interface device and the reference (23), inserting the wire inside the head (1) by means of said first or second eyelet (4a or 4b);

following the insertion of the wire, operating said reloading device to wind a quantity of said wire on the spool (6).

* * * * *